US010091058B2

(12) United States Patent
Strassner (10) Patent No.: US 10,091,058 B2
(45) Date of Patent: *Oct. 2, 2018

(54) METHOD AND APPARATUS FOR MODEL-DRIVEN, AFFINITY-BASED, NETWORK FUNCTIONS (71) Applicant: Futurwei Technologies, Inc., Plano, TX (US)

(72) Inventor: John Strassner, North Barrington, IL (US)

(73) Assignee: Futurewei Technologies, Inc., Plano, TX (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/537,546

(22) Filed: Nov. 10, 2014

(65) Prior Publication Data

US 2016/0134474 A1    May 12, 2016

(51) Int. Cl.
G06F 15/173    (2006.01)
H04L 12/24    (2006.01)
G06F 9/50    (2006.01)

(52) U.S. Cl.
CPC ........ *H04L 41/0816* (2013.01); *G06F 9/5077* (2013.01); *H04L 41/0823* (2013.01); *H04L 41/0893* (2013.01); *H04L 41/0896* (2013.01); *H04L 41/5054* (2013.01);
(Continued)

(58) Field of Classification Search
None
See application file for complete search history.

(56) References Cited

U.S. PATENT DOCUMENTS 6,611,867 B1    8/2003    Bowman-Amuah et al.
7,340,522 B1    3/2008    Basu et al.
8,244,874 B1    8/2012    Thireault
(Continued)

FOREIGN PATENT DOCUMENTS

CN    102004671    4/2011
CN    103703724    4/2014
(Continued)

OTHER PUBLICATIONS

"International Application Serial No. PCT/CN2015/094193, International Search Report dated Feb. 14, 2016", 6 pgs.
(Continued)

*Primary Examiner* — S M Rahman
*Assistant Examiner* — Dae Kim
(74) *Attorney, Agent, or Firm* — Schwegman Lundberg & Woessner, P.A.

(57) ABSTRACT

An approach to affinity-based network configuration is disclosed. In one approach, an apparatus for configuring a network based on affinity is described. The apparatus includes a set of business rules describing the order of importance of a plurality applications, an affinity analysis module that receives the set of business rules and a plurality of application requests and detects affinities between the application requests and an infrastructure of the network based on the set of business rules, an affinity computation module coupled to the affinity analysis module that determines a new network configuration based on the detected affinities, and a network management module that configures the network based on the new network configuration.

16 Claims, 10 Drawing Sheets (52) U.S. Cl.
CPC .......... *H04L 41/044* (2013.01); *H04L 41/145* (2013.01); *H04L 41/5051* (2013.01)

(56) References Cited

U.S. PATENT DOCUMENTS

| | | | |
|---|---|---|---|
| 8,356,087 B1* | 1/2013 | Miller | H04L 63/0272 |
| | | | 709/220 |
| 8,843,894 B2 | 9/2014 | Dawson et al. | |
| 9,294,437 B1 | 3/2016 | Ganguly et al. | |
| 9,301,026 B2 | 3/2016 | Srinivas et al. | |
| 2004/0230681 A1 | 11/2004 | Strassner et al. | |
| 2007/0043860 A1* | 2/2007 | Pabari | G06F 9/5072 |
| | | | 709/224 |
| 2008/0161941 A1 | 7/2008 | Strassner et al. | |
| 2008/0271022 A1 | 10/2008 | Strassner et al. | |
| 2010/0306354 A1 | 12/2010 | DeHaan et al. | |
| 2010/0306382 A1 | 12/2010 | Cardosa et al. | |
| 2011/0131309 A1 | 6/2011 | Akiyama et al. | |
| 2012/0140636 A1* | 6/2012 | Resende | H04L 45/124 |
| | | | 370/238 |
| 2013/0108259 A1* | 5/2013 | Srinivas | H04Q 3/0083 |
| | | | 398/25 |
| 2013/0108264 A1 | 5/2013 | deRuijter et al. | |
| 2014/0344453 A1 | 11/2014 | Varney et al. | |
| 2015/0334696 A1 | 11/2015 | Gu et al. | |
| 2015/0381410 A1 | 12/2015 | Strassner | |
| 2017/0031623 A1 | 2/2017 | Gong et al. | |

FOREIGN PATENT DOCUMENTS

| | | |
|---|---|---|
| CN | 104137482 A | 11/2014 |
| EP | 2922238 | 9/2015 |
| EP | 3143511 | 3/2017 |
| WO | WO-2010056545 A1 | 5/2010 |
| WO | WO-2013138096 A1 | 9/2013 |
| WO | WO-2013159291 | 10/2013 |

OTHER PUBLICATIONS

"International Application Serial No. PCT/CN2015/094193, Written Opinion dated Feb. 14, 2016", 4 pgs.

"Affinity Networking for Data Centers and Clouds Solution Overview", Plexxi, Inc., Dec. 2012, pp. 1-5, (Dec. 2012), 1-5.

"European Application No. 15810904.1, Extended European Search Report dated Mar. 9, 2017", (Mar. 9, 2017), 10 pgs.

"European Application No. 15858626.3, Extended European Search Report dated Oct. 13, 2017", (Oct. 13, 2017), 11 pgs.

"International Application No. PCT/CN2015/082371, International Search Report and Written Opinion dated Sep. 1, 2015", (Sep. 1, 2015), 11 pgs.

Gulati, Ajay, et al., "Vmware distributed resource management: Design, implementation, and lessons learned", Vmware Technical Journal (VMTJ), Vmware Labs 1,9 , vol. 1, No. 1, Mar. 1, 2012, pp. 45-64, (Mar. 1, 2012), 45-64.

Li, Qiang, et al., "An Integrated Approach to Automatic Management of Virtualized Resources in Cloud Environments", Computer Journal, vol. 54, No. 6, Nov. 24, 2010, pp. 905-919, (Nov. 24, 2010), 905-919.

* cited by examiner

METHOD AND APPARATUS FOR MODEL-DRIVEN, AFFINITY-BASED, NETWORK FUNCTIONS

BACKGROUND

Affinity defines a relationship between entities that describes a preference for two entities to communicate using a particular set of resources instead of a randomly chosen set of resources. As such, affinity is a concept that is independent of any one particular device, technology, or communication. Rather, affinity refers to communications that have known patterns between entities and/or technologies, as opposed to communication that is random in nature.

Affinity-based networking enables applications to specify intent about how their application or service works independent of the underlying infrastructure. The problem with this approach is different applications have different services, which complicates the identification of services that exhibit an affinity to resources and vice-versa. More importantly, the same set of services can be used in different ways by different applications, making the solution even more difficult. In addition, services are sensitive to their context (e.g., network load, type of infrastructure resources used, which other services are using the same shared resources, etc.). Hence, the infrastructure that supported one service may not be appropriate for a new instance of that same service if the operational context changed.

SUMMARY

A goal of the present invention is to enable the affinity service to more easily identify existing, and define new, infrastructure resources that have an affinity for a set of services as a function of context.

In one approach, a method of configuring a network based on affinity begins by receiving a plurality of application requests and a set of business rules that describe the order of importance of a plurality of applications at an affinity analysis module. Affinities between application requests and a network-based infrastructure are detected based on the set of business rules. A new network configuration is derived based on the detected affinities, and the network is configured based on the new network configuration.

In another approach, an apparatus for configuring a network based on affinity is described. The apparatus includes a set of business rules describing the order of importance of a plurality of applications, an affinity analysis module that receives the set of business rules and a plurality of application requests and detects affinities between the application requests and an infrastructure of the network based on the set of business rules, an affinity computation module coupled to the affinity analysis module that determines a new network configuration based on the detected affinities, and a network management module that configures the network based on the new network configuration.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof may be disclosed in a figure herein describing the operations of this method (such as FIG. 10), such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system 912, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Model-Driven, Affinity-Based, Network Functions

This invention describes the use of model-based engineering, in conjunction with an information model, to provide inherent extensibility in the definition and use of affinity-based Network Functions Virtualization (NFV) for application developers. More specifically, this invention targets the ongoing shift of traditional network management (NetOps) into developer-focused application building to perform management tasks (DevOps).

Affinity may be considered to be an inherent similarity between a set of applications and the capabilities that a network-based infrastructure provides. This similarity implies that some elements in the system need to communicate with some other set of specific elements much more than they do with other elements. Hence, this invention defines mechanisms for computing affinity that enables a set of applications to efficiently use network infrastructure.

In the following embodiments, an approach is described for affinity-based network configuration. In one approach, a method of configuring a network based on affinity begins by receiving a plurality of application requests and a set of business rules that describe the order of importance of a plurality of applications at an affinity analysis module. Affinities between application requests and a network-based infrastructure are detected based on the set of business rules. A new network configuration is derived based on the detected affinities, and the network is configured based on the new network configuration.

In another approach, a system for configuring a network based on affinity is described. The system includes a set of business rules describing the order of importance of a plurality of applications, an affinity analysis module that receives the set of business rules, and a plurality of application requests, and detects affinities between the application requests and a network-based infrastructure using the set of business rules, an affinity computation module coupled to the affinity analysis module that determines a new network configuration based on the detected affinities, and a network management module that configures the network based on the new network configuration.

Affinity-Based Network Functions Virtualization Management System

Figure 1:
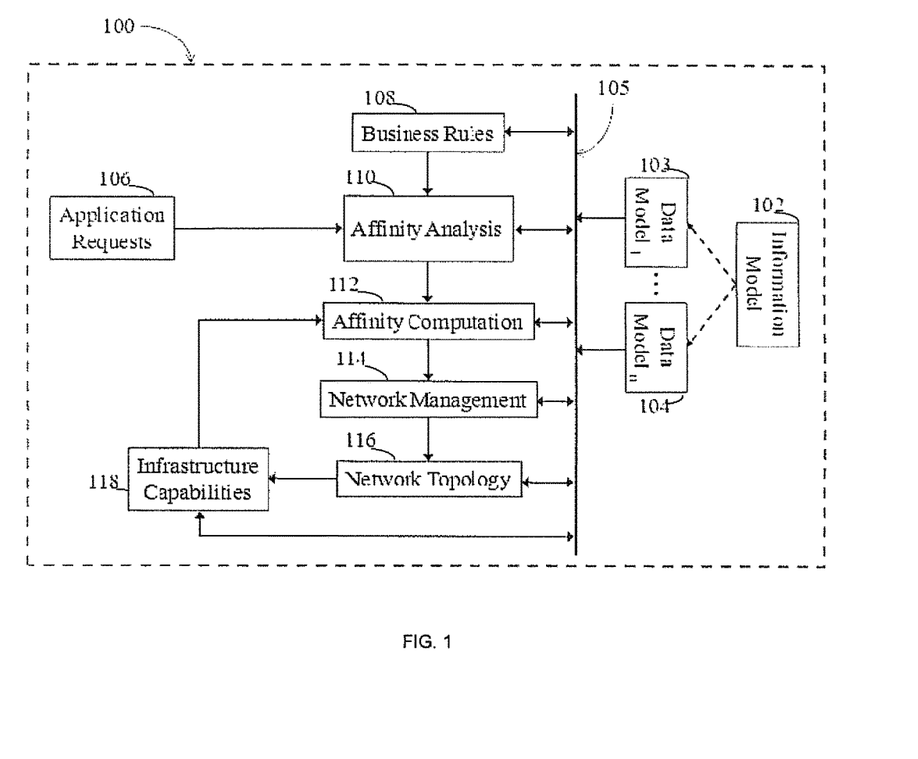
FIG. 1 is a block diagram of an exemplary system architecture upon which embodiments of the present invention may be implemented.

With reference now to FIG. 1, a high-level system architecture of a Model-driven Affinity-based Network Functions Virtualization (NFV) Management System 100 is depicted, in accordance with embodiments of the present invention. Object-oriented Information Model 102 contains definitions of entities and their relationships that may be accessed by the managed environment. Information models are independent of platform, language, and protocol. A set of Data Models 103 and 104 are defined from the Information Model 102 to map a technology-neutral abstraction of entities and their relationships into a more concrete form that is more suitable for implementation. Information Model 102 and Data Models 103 and 104 may comprise a DEN-ng model, and Oracle RDBMS, and/or a Neo4j NoSQL repository, according to some embodiments.

Information/data bus 105 enables components 108-118 to communicate with the data models (e.g., data models 103 and 104) being used. Concepts used in this invention may be represented using model elements from the information model; these model elements are mapped to one or more data elements, which are then made available to other components (e.g. components 108-118). The information model provides cohesion, as well as a common vocabulary, for each module to use. For example, a business rule may describe how affinity is defined and used. The business rule, the concept of affinity, and the services and resources that will be bound together using affinity may be represented as Manageable Entities in the information model. This arrangement makes it easier for application developers to define and use rules to manage affinity-based services.

Application requests 106 are analyzed by the Affinity Analysis module 110 to determine if affinities between new application request and the network infrastructure exist. Business rules 108 define a set of rules to prioritize the order of importance of applications. This may be necessary when multiple applications request the same shared resources in the infrastructure. The output of the Affinity Analysis module 110 is sent to the Affinity Computation module 112, which combines the affinity information with data from the network to determine how to reconfigure the network to make use of affinity data. The results are sent to the Network Management system 114, which configures the Network Topology 116. Infrastructure Capabilities 118 are derived from the currently configured infrastructure. This data represent potential adjustments to the infrastructure based on the Affinity Analyzer block 110, and the data may be fed back to the Affinity Calculator 112 to enable further optimizations.

Data Model Mapping from Generic Information Models

Figure 2:
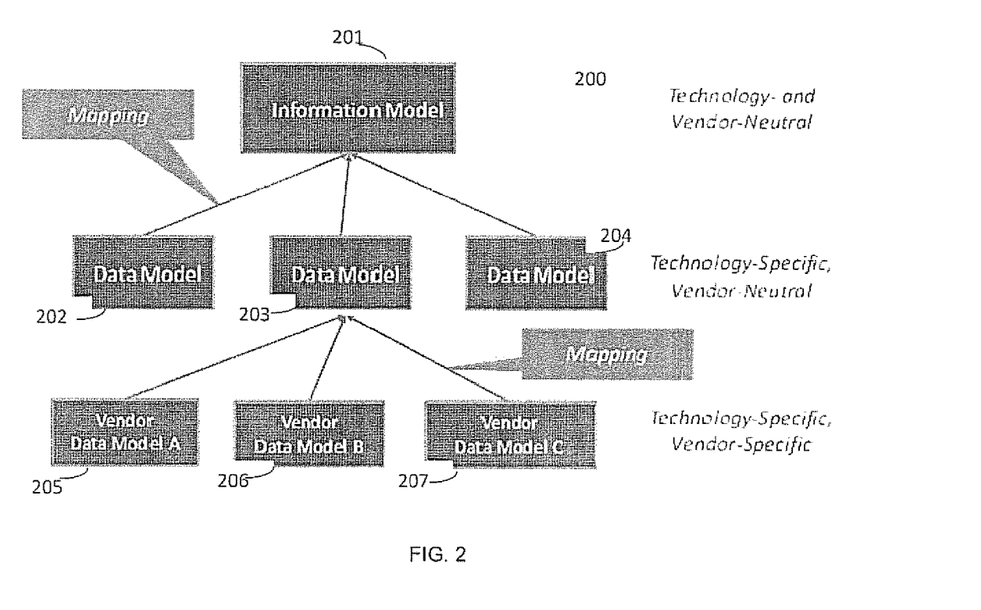
FIG. 2 is a block diagram illustrating exemplary mappings between an information model, data models, and vendor data models, in accordance with embodiments of the present invention.

With reference now to FIG. 2, mappings 200 between a single Information Model 201 and three different Data Models 202-204 are depicted. For example, one data model may be based on relational algebra, one on NoSQL, and the other on directory technologies. Common concepts or components (e.g., a common customer or router) may be represented in each of these three data models; however, the structure of the information may be different in each case. Furthermore, any of these vendor-neutral (but technology-specific) data models, such as one for relational databases using SQL92, may be translated/mapped into a vendor-specific form (e.g., Vendor Data Models 205-207). For example, the SQL92 model is independent of vendor implementation, but each vendor has their own extensions and implementation of SQL92 that may provide added value.

Management Topologies for Affinity-Based Networking

Figure 3:
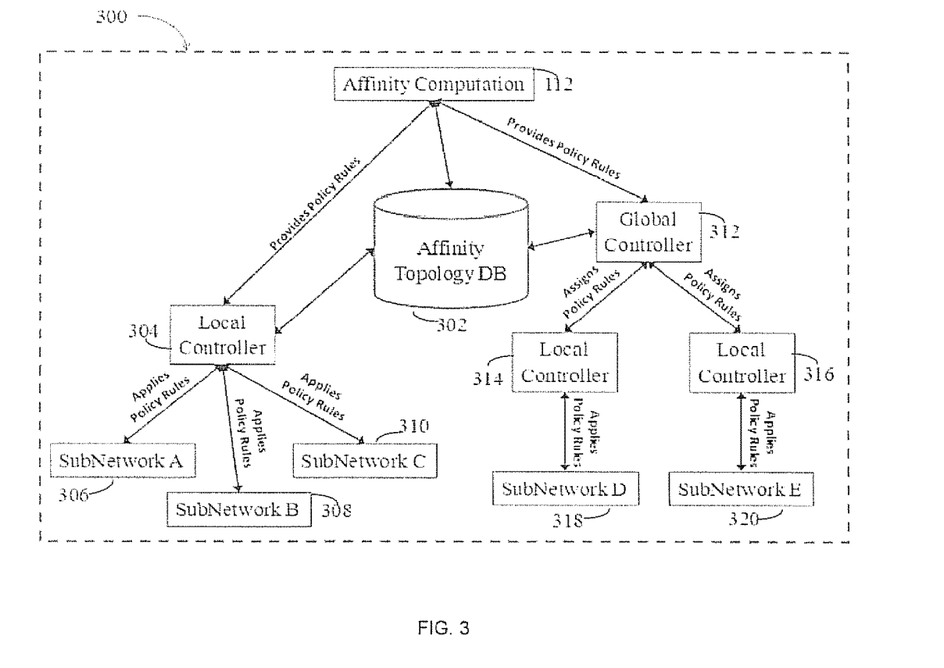
FIG. 3 is a block diagram illustrating exemplary management topologies for affinity-based networking, in accordance with embodiments of the present invention.

With reference now to FIG. 3, two exemplary management topologies implementing affinity-based networking are depicted, according to embodiments of the present invention. Affinity Computation module 112 stores results in the Affinity Topology Database 302. The results may be sent to one or more controllers used in the network (e.g., Local Controller 304). A controller is a management system that is used to control the network infrastructure. This enables embodiments of the invention to be used with legacy as well as future network management systems. Such controllers may be local to a domain (e.g., Local Controller 304, 314, and 316) or inter-domain (e.g., Global Controller 312). A local controller is responsible for configuring one or more subnetworks (e.g., SubNetworks 306-310 and SubNetworks 318-320) using the results of the Affinity Computation 112, and a global controller is responsible for configuring the local controllers that it manages.

Still with reference to FIG. 3, the Affinity Computation module 112 passes policy rules to global controllers (e.g., Global Controller 312) and any local controllers that are not governed by a global controller (e.g., Local Controller 304). The global controller may modify policy rules received from the Affinity Computation module 112 to suit the nature of the various domains that it governs. After any such modification, the global controller will assign appropriate policy rules to the local controllers that it governs (e.g., Local Controller 314 and 316). The local controllers then examine the policy rules that have been received and modify them as appropriate for use on the resources that they manage. The local controllers then apply these policy rules when appropriate.

Virtualized Network Functions for a Customizable Chain of Services

Figure 4:
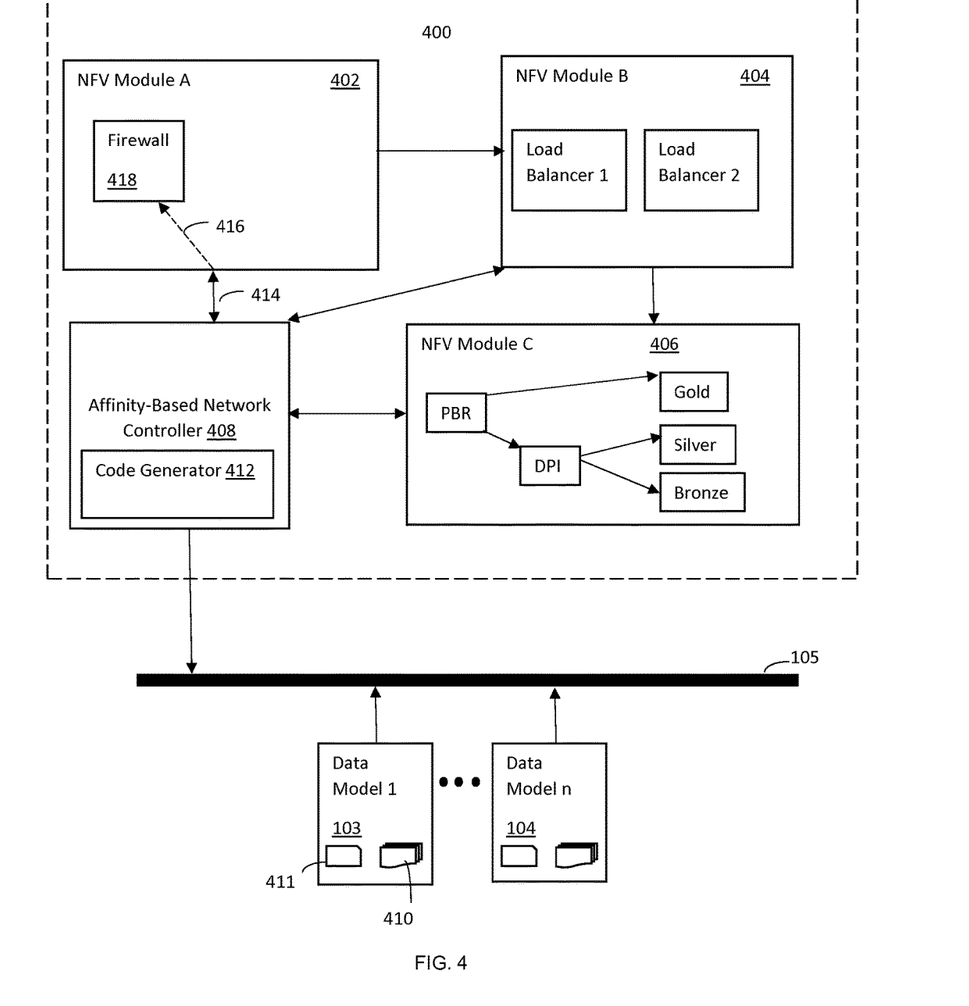
FIG. 4 is block diagram illustrating an exemplary application using Virtualized Network Functions to build a chain of services, in accordance with embodiments of the present invention.

With reference now to FIG. 4, an exemplary application of Virtualized Network Functions (VNFs) to build a customizable chain of services is depicted, according to some embodiments of the present invention. The NFV Modules 402, 404, and 406 may provide different services to the traffic that they receive. The Affinity-based Network Controller 408 determines different affinities that exist between different subnetworks, as well as the traffic that flows between them and which services from which NFV Modules should be applied to the various traffic streams.

With reference still to FIG. 4, Data Model 103 comprises a Configuration Object 410 and a Policy Rule 411 for a firewall 418 in NFV Module 402. The Affinity-based Code Generator 408 retrieves the configuration object, as well as a corresponding policy rule or set of policy rules from Data Model 103 using the information bus 105. The Code Generator 412 takes the policy rule and the configuration object, and creates a new Policy Rule 414 that is suitable for programming the firewall. The first Policy Rule 411 uses general terminology (e.g., terminology oriented for a business person), while the second Policy Rule 414 transforms the rule to a form suitable for device implementation to produce reconfiguration commands 416. Since the Firewall, its configuration, and the policy rule are all represented in the information model, they form a coherent set of processing operations.

Affinity-Based Network Controller and Affinity Analyzer

Figure 5:
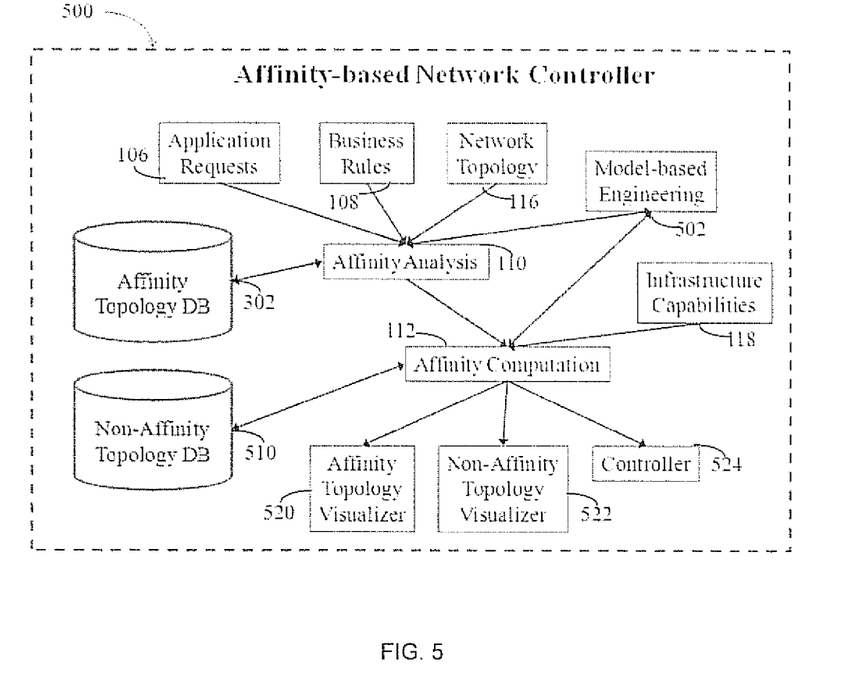
FIG. 5 is a detailed view of an exemplary Affinity-based Network Controller, in accordance with one embodiment.

With reference now to FIG. 5, a detailed view of the Affinity-based Network Controller 500 is depicted, according to embodiments of the present invention. Affinity-based Network Controller 500 may have different types of inputs: Application Requests 106 represent the raw traffic to be analyzed to discover affinity relationships, Business Rules 108 define different priorities and other semantics that must be taken into account by the Affinity Analyzer, and the current Network Topology 106 comprises information that defines which applications and customers are currently using which resources and paths in the infrastructure. Business Rules 108 may be used to abstract the importance of various affinity rules, enabling conflicts between them to be resolved by various means (e.g., prioritizing the importance of different rules if two or more can be applied at the same time to the same traffic).

With reference still to FIG. 5, Model-based Engineering module 502 uses a variety of data models to generate code to support the operations of the Affinity Analyzer 110 and the Affinity Computation module 112. The output of the Affinity Computation module 112 is fed to the Affinity Topology Visualizer 520, the Non-Affinity Topology Visualizer 522, and the Controller 524. The Affinity Topology Visualizer 520 and the Non-Affinity Topology Visualizer 522 enable users to see the results of the affinity analysis and computation processes by showing traffic that affinity is and is not applied to, respectively. The Controller 524 represents both global and local Controllers (e.g. Controllers 312 and 304, respectively, depicted in FIG. 2). Finally, the Infrastructure Capabilities 118 represent additional network-based services that could be made available through additional configuration of the infrastructure (e.g., provisioning of additional bandwidth or low latency connections).

Figure 6:
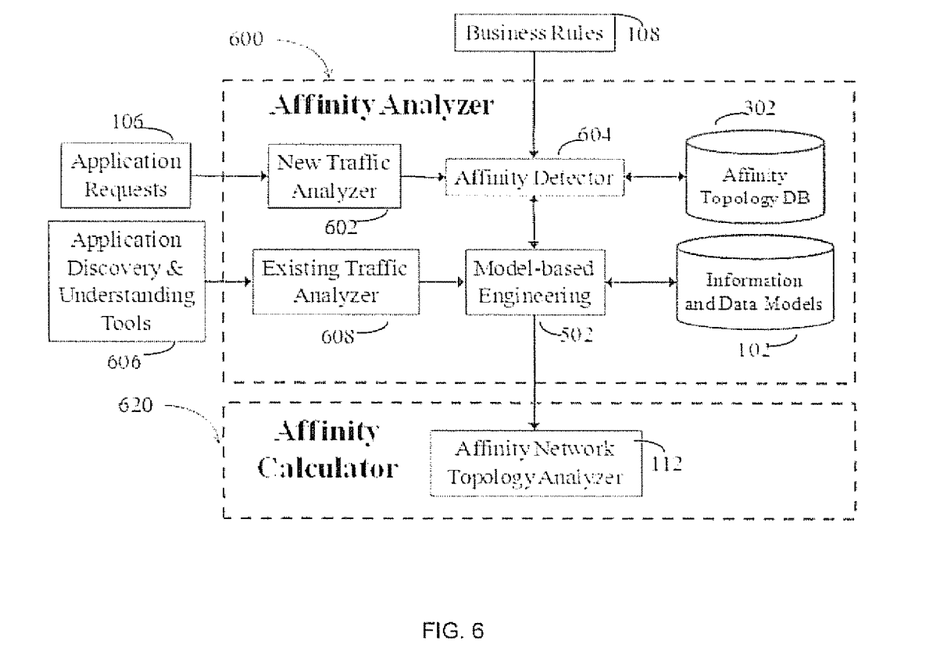
FIG. 6 is a detailed view of an exemplary Affinity Analyzer, in accordance with one embodiment.

With reference now to FIG. 6, detailed view of the Affinity Analyzer 600 is depicted according to embodiments of the present invention. The Affinity Analyzer block 600 determines new traffic and application affinities, prioritizes them using applicable business rules, and compares their needs and operation with the current network utilization. These results are sent to the Affinity Calculator module 620, which uses the capabilities of the Infrastructure 118 (shown in FIG. 1) to determine if new application requests should be routed over existing paths and use existing resources, or if it is advantageous to use new paths and/or resources to service new traffic. Application Requests 106 represent raw traffic to be analyzed to derive affinity relationships. New Traffic Analyzer 602 analyzes new application requests using a combination of existing management tools (e.g., Protocol Analyzers (e.g., nGenius, Wireshark, tcpdump), Log Analyzers (e.g., Syslog, Splunk), Element and Network Management Systems (e.g., Tivoli), Virtualization Management Tools (e.g., vSphere)), and custom software tools. The Affinity Detector 604, in conjunction with the Model-based Engineering module 502, examines the new application traffic and matches traffic flows with models that identify applications, customers, and other pertinent information. This enables the Affinity Detector 604 to use business rules to prioritize different flows from different applications, based on Customer, time of day, Service Level Agreement (SLA), and/or the amount of congestion in the network, for example. Business Rules 108 define different priorities and other semantics taken into account by the Affinity Detector 604. Business Rules are used to decouple the definition of affinity from its implementation. More specifically, business rules use a simple grammar that is conducive for program managers, analysts, and application developers, and does not resemble the low-level programming required to configure network devices.

With reference still to FIG. 6, a variety of tools may be used to retrieve key statistics and information from existing applications. Existing Traffic Analyzer 608 can use tools such as Application Discovery Understanding Tools 606, Application Discovery and Understanding Tools (e.g., IBM Infosphere), Application Performance Management Tools (e.g., Foglight, Riverbed), and/or Protocol Analyzers. Existing Traffic Analyzer 608 works with Model-based Engineering module 502 to identify existing traffic in the infrastructure, and determine how the traffic has evolved (e.g., is it compliant with its SLAs; is it obeying as expected; is there more traffic than was anticipated). This is combined with the output of the Affinity Detector 604 by Model-based Engineering Module 502 and delivered to Network Topology Analyzer 112 of Affinity Calculator 620, which is described in FIG. 7.

New affinities that have been detected are stored in Affinity Topology database 302 and sent to Model-based Engineering module 502. Existing Traffic Analyzer 608 periodically checks to see if there are changes to any of the affinities previously detected. These changes are sent to Model-based Engineering module 502, which uses information from the models (e.g., models 102-104 shown in FIG. 1) to recognize new affinities and detect changes in both services and infrastructure according to priorities specified in the business rules. The results are sent to Network Topology Analyzer 112, which is described in FIG. 7.

Model-based Engineering module 502 uses Information Model 102 (shown in FIG. 1) to create one or more data models (e.g., Data Models 103-104 shown in FIG. 1). Models abstract the knowledge and information present in a given domain. Model-based Engineering module 502 uses this knowledge to manage the definition and assignment of affinities. More specifically, the concepts of affinity, and how different entities are related by affinity, are abstracted through the use of information and data models. Model-based Engineering module 502 enables the system to work with abstractions of affinity, rather than abstractions that are rooted in the capabilities of a particular computing paradigm. For example, this invention may use domain-specific concepts instead of generic elements from a programming language to better model affinity and affinity-based relationships.

Figure 7:
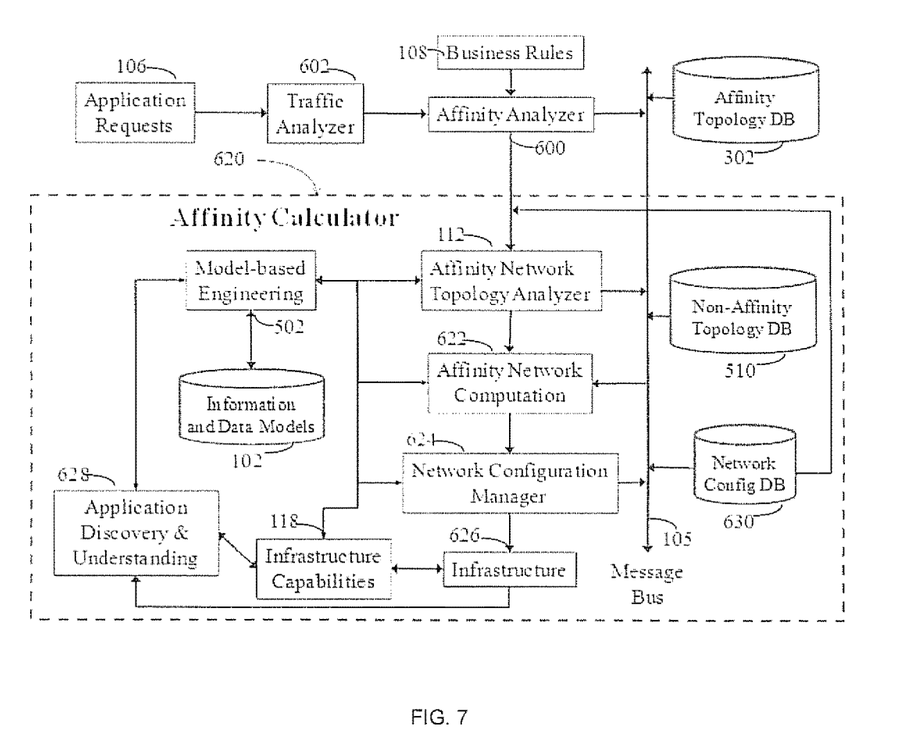
FIG. 7 is a detailed view of an exemplary Affinity Calculator, in accordance with one embodiment.

With reference now to FIG. 7, Affinity Network Topology Analyzer 112 determines how new and existing traffic may be merged and associated with affinities using the information and data models. Affinity Network Topology Analyzer 112 outputs a set of data describing said information to Affinity Network Computation module 622. According to some embodiments, the output of the Affinity Network Topology Analyzer 112 is a set of tuples. An exemplary tuple may be defined as: {FlowID, AppID, CustomerSLAID, NetworkPath, NetworkPathHealth, Metadata}, where:

FlowID is an unambiguous identifier for a particular application's flow

AppID is an unambiguous identifier for a particular application

CustomerSLAID is an unambiguous identifier for a particular customer's SLA

NetworkPath is a listing of the network node ports that a particular flow travels through NetworkPathHealth defines various health metrics for the NetworkPath Metadata is an array of references to metadata objects in one or more data models In the above exemplary tuple, metadata may describe affinity data, affinity relationship data, affinity services, and/or resources that participate in affinity-based relationships. The metadata may provide additional semantics that describe one or more Manageable Entities that are participating in an affinity-based relationship, including the affinity element itself.

With reference still to FIG. 7, the output of Affinity Network Topology Analyzer 112 is sent to Affinity Network Computation module 622, which constructs two logical topologies. Where necessary, Affinity Network Computation module 622 re-computes the network topology using Non-Affinity Topology Database ("DB") 510. Affinity Network Computation module 622 may also compute the possible network affinities using Affinity Topology DB 302 and determine where the Affinity Topology potentially overlays the existing network infrastructure. Affinity Network Computation module 622 determines if the network affinities should be programmed into the network or not using the current set of Infrastructure Capabilities 118. The output of the Affinity Network Computation module 622 comprises candidate changes to both Affinity Topology DB 302 and the Non-Affinity Topology DB 510. These changes are verified and implemented by Network Configuration Manager 624 using its current Network Configuration DB 630. Network Configuration Manager 624 then generates an appropriate set of commands to reconfigure the affected resources in Infrastructure 626. This may be accomplished using policy rules, according to some embodiments of the present invention.

With reference still to FIG. 7, Infrastructure Capabilities 118 represent the current usage of resources in the infrastructure, detailing which resources are unused, which have remaining capacity or availability, and which are utilized to the point that they cannot accommodate any new traffic. This set of computations may require additional information beyond what is available in the resource itself (e.g., business importance of the traffic being carried, or the Service Level Agreements that are associated with this traffic). Therefore, Infrastructure Capabilities are a combination of raw information from the Infrastructure (e.g., performance counters, such as percent CPU utilization, or alarm indicators), computed information about the Infrastructure by Model-based Engineering module 502 (e.g., statistics on counters, or matching of different data over a period of time), and inferred information about the infrastructure by Model-based Engineering module 502 (e.g., probable root cause of an alarm). Infrastructure Capabilities 118 are periodically updated and sent to all modules that can use that information.

Both Infrastructure Capabilities 118 and output from Infrastructure 626 are fed to Application Discovery and Understanding module 628. This module may use a variety of tools to retrieve key statistics and information from existing applications. Examples include Application Discovery and Understanding Tools (e.g., IBM Infosphere), Application Performance Management Tools (e.g., Foglight, Riverbed), and Protocol Analyzers. These tools work with Model-based Engineering module 502 to identify existing traffic in the infrastructure and determine how the traffic has evolved (e.g., is it compliant with its SLAs; is it obeying as expected; is there more traffic than was anticipated). This is sent to Model-based Engineering module 502, which supports the operation of the Affinity Network Topology Analyzer, the Affinity Network Computation, and the Network Configuration Manager.

Figure 8:
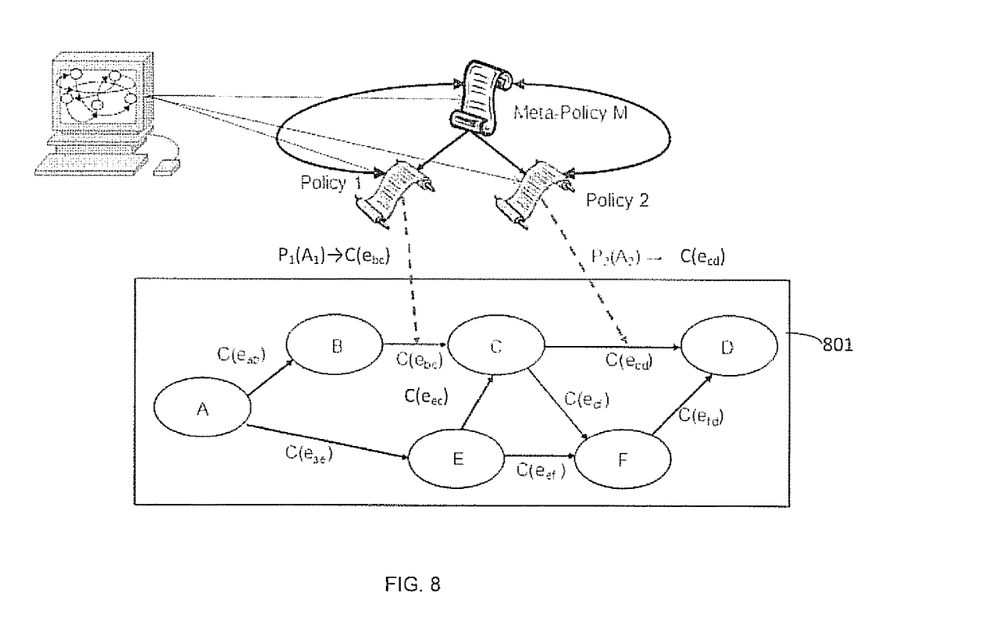
FIG. 8 is a diagram illustrating exemplary steps for defining affinity-based relationships based on Policy Rules, in accordance with embodiments of the present invention.
Figure 9:
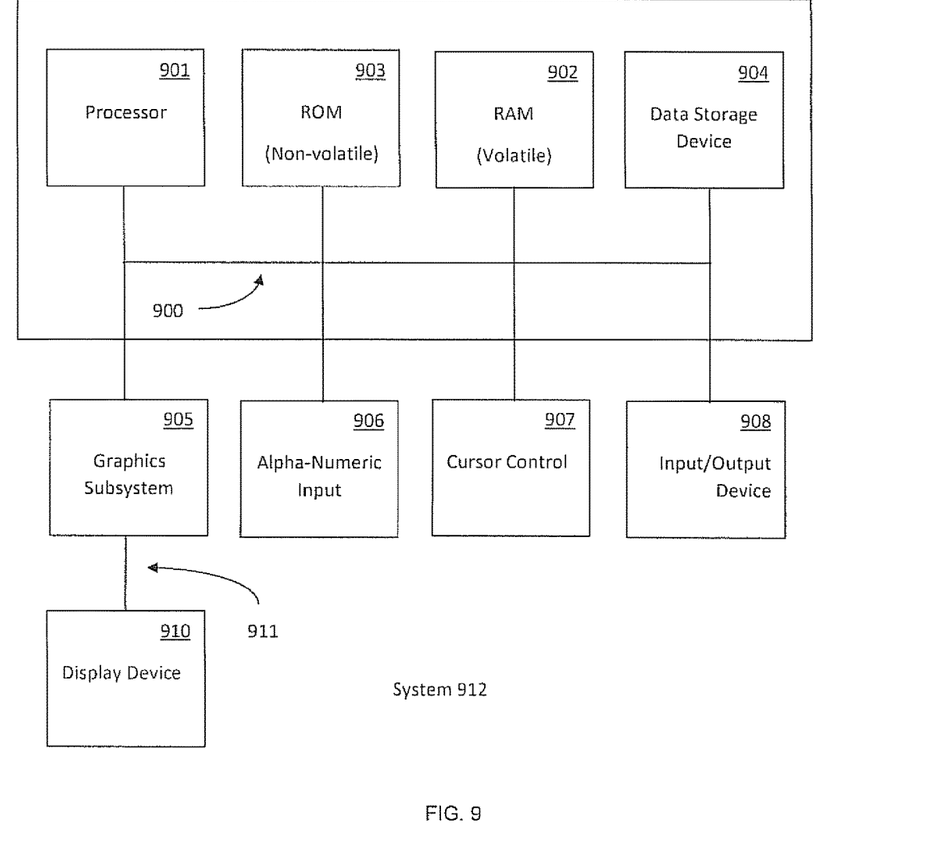
FIG. 9 is a diagram illustrating an exemplary computer system upon which embodiments of the present invention may be implemented.

With reference now to FIG. 8, an exemplary network topology 801 is depicted, according to some embodiments of the present invention. Policy rules may define and change affinity-based relationships in this invention. Policy rules, affinity, and other concepts may be defined in the same information model, and hence, may be related to each other. As shown in FIG. 8, each edge has a cost associated with it, designated as $C(e_{xy})$, where $e_{xy}$ is the cost of traversing from node x to node y. Many different algorithms exist for finding the optimum path (e.g., the path that has the least cost). According to embodiments of the present invention, a policy rule may change the weight associated with each edge, which in turn changes the optimum path. Thus, affinities, once detected, may be easily implemented by such a mechanism. As depicted in FIG. 8, metadata may be used to coordinate the application of the two policy rules.

Figure 10:
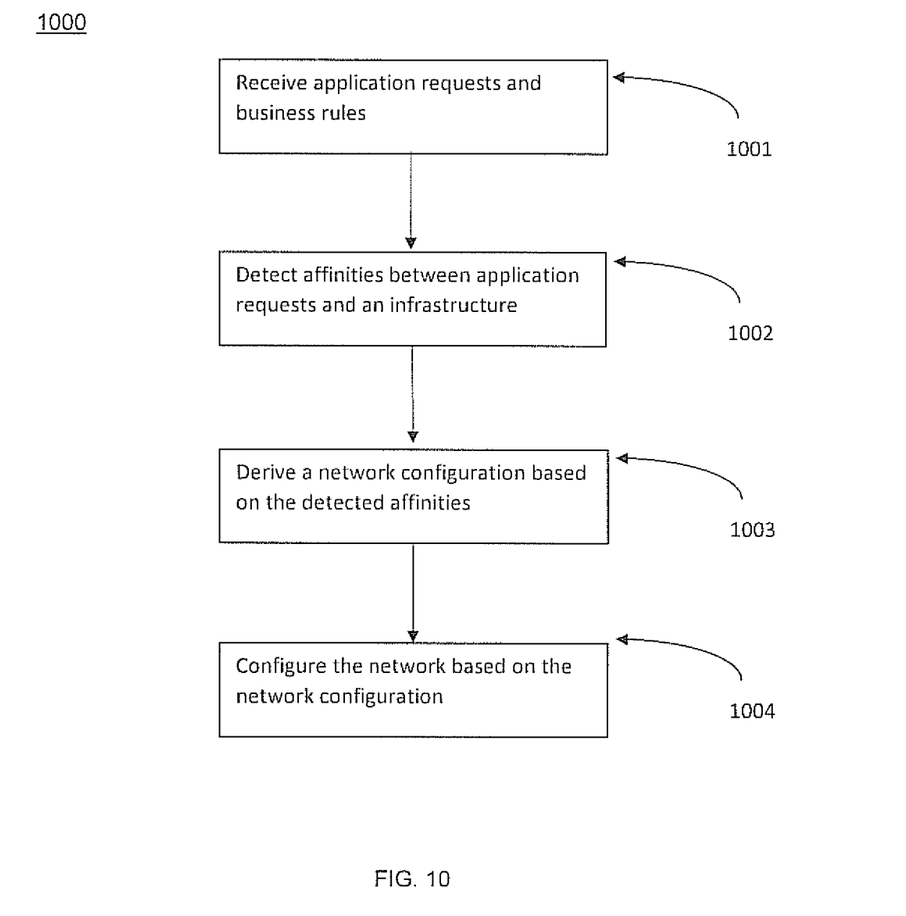
FIG. 10 is a flow chart illustrating an exemplary sequence of steps for configuring a network based on affinity, in accordance with embodiments of the present invention.

With reference now to FIG. 10, an exemplary sequence of steps for configuring a network based on affinity is depicted according to embodiments of the present disclosure. Flow chart 1000 begins at step 1001, where application requests and business rules are received. At step 1002, affinities between application requests and an infrastructure are detected. Continuing with step 1003, a network configuration is derived based on the detected affinities. The network is configured based on the network configuration at step 1004.

Embodiments of the present invention are thus described. While the present invention has been described in particular embodiments, it should be appreciated that the present invention should not be construed as limited by such embodiments, but rather construed according to the following claims.

What is claimed is:

1. An apparatus for configuring a network based on affinity, comprising:
    memory storage comprising a set of business rules describing an order of importance of a plurality of applications, data identifying a set of service level agreements (SLAs), each of the plurality of applications being associated with one of the plurality of SLAs, and instructions;
    one or more processors in communication with the memory, wherein the one or more processors are configured to execute the instructions to:
        receive the set of business rules and a plurality of application requests and detect affinities between the application requests and an infrastructure of the network based on the set of business rules, wherein the infrastructure comprises a plurality of network edges, each network edge defining a network path and having an associated cost;
        evaluate traffic in the network including evaluating whether each application of the plurality of applications is compliant with the SLA associated with the application;
        determine a new network configuration based on the received plurality of application requests, the received set of business rules, whether each application of the plurality of applications is compliant with the SLA associated with the application, and the detected affinities;
        generate policy rules to reconfigure the network to accommodate the detected affinities for the received plurality of application requests; and
        apply the generated policy rules to change weights of ones of the plurality of network edges to configure the network based on the new network configuration.

2. The apparatus of claim 1, wherein the set of business rules are derived from a set of vendor-neutral data models.

3. The apparatus of claim 2, wherein at least one of the data models comprises a configuration object.

4. The apparatus of claim 2, wherein at least one of the data models is derived from a technology-neutral or vendor-neutral information model.

5. The apparatus of claim 1, wherein:
    the memory storage further comprises an affinity database for storing the detected affinities and wherein the one or more processors are configured to execute further instructions to:
    control, by a local network controller, an infrastructure of the network and configure the infrastructure of the network based on the detected affinities; and
    configure, by the local network controller, a subnetwork coupled to the local network controller based on the detected affinities.

6. The apparatus of claim 5, wherein the local network controller is configured by a global network controller.

7. The apparatus of claim 2, wherein the policy rules comprise at least one of (i) data and metadata that define semantics and a behavior of the policy rule, (ii) a set of events that may trigger an evaluation of a condition clause of the policy rule, (iii) an aggregated set of policy conditions, and (iv) an aggregated set of policy actions.

8. The apparatus of claim 1, wherein the one or more processors are configured to execute further instructions to:
    derive infrastructure capabilities from the network infrastructure, pass the derived infrastructure capabilities to an affinity computation module, derive a second network configuration, by the affinity computation module, based on the detected affinities and infrastructure capabilities, and configure the network, by a network management module, based on the second network configuration.

9. A computer-implemented method of configuring a network based on affinity, comprising:
    receiving, at an affinity analysis module, a plurality of application requests a set of business rules that describe an order of importance of a plurality of applications, and data identifying a set of service level agreements (SLAs), each of the plurality of applications being associated with one of the plurality of SLAs;

detecting affinities between application requests and an infrastructure of the network based on the set of business rules, wherein the infrastructure comprises a plurality of network edges, each network edge defining a network path and having an associated cost;

evaluating traffic in the network including evaluating whether each application of the plurality of applications is compliant with the SLA associated with the application;

determining policy rules based on the received plurality of application requests, the received set of business rules, whether each application of the plurality of applications is compliant with the SLA associated with the application, and the detected affinities, wherein the policy rules determine respective weights associated with ones of the network paths;

deriving a first network configuration based on the detected affinities and the policy rules such that the first network configuration comprises a least total cost based on the associated weights and costs of each network path in the first network configuration; and applying the policy rules to configure the network based on the first network configuration.

10. The method of claim 9, wherein the set of business rules are derived from a set of vendor-neutral data models.

11. The method of claim 10, wherein at least one of the data models comprises a configuration object.

12. The method of claim 10, wherein at least one of the data models is derived from a technology-neutral or vendor-neutral information model.

13. The method of claim 9, further comprising:
storing the detected affinities in an affinity database;
configuring a local network controller that controls the network infrastructure based on the detected affinities; and
using the local network controller to configure a subnetwork based on the policy rules.

14. The method of claim 13, wherein the local network controller is configured by a global network controller.

15. The method of claim 10, wherein the policy rules comprise at least one of (i) data and metadata that define semantics and a behavior of the policy rule, (ii) a set of events that may trigger an evaluation of a condition clause of the policy rule, (iii) an aggregated set of policy conditions, and (iv) an aggregated set of policy actions.

16. The method of claim 9, further comprising:
deriving infrastructure capabilities from the network infrastructure;
deriving a second network configuration based on the detected affinities and infrastructure capabilities;
deriving further policy rules to implement the second network configuration; and
applying the further policy rules to configure the network based on the second network configuration.

* * * * *

UNITED STATES PATENT AND TRADEMARK OFFICE
CERTIFICATE OF CORRECTION

PATENT NO. : 10,091,058 B2
APPLICATION NO. : 14/537546
DATED : October 2, 2018
INVENTOR(S) : John Strassner It is certified that error appears in the above-identified patent and that said Letters Patent is hereby corrected as shown below:

In the Specification

In Column 6, Line 36, delete "106" and insert --116-- therefor

In the Claims

In Column 10, Line 66, in Claim 9, after "requests", insert --,--

Signed and Sealed this
Eighth Day of December, 2020

Andrei Iancu
*Director of the United States Patent and Trademark Office*